United States Patent
Mansor

(10) Patent No.: US 12,450,406 B2
(45) Date of Patent: Oct. 21, 2025

(54) METHOD FOR VALIDATING NON-MATRIX VUG FEATURES IN SUBTERRANEAN ROCKS

(71) Applicant: SAUDI ARABIAN OIL COMPANY, Dhahran (SA)

(72) Inventor: Abdulmohsin Mansor, Aziziah (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 787 days.

(21) Appl. No.: 17/729,721

(22) Filed: Apr. 26, 2022

(65) Prior Publication Data

US 2023/0342517 A1  Oct. 26, 2023

(51) Int. Cl.
G06F 30/20 (2020.01)
E21B 41/00 (2006.01)
G01V 3/20 (2006.01)
G06F 113/08 (2020.01)

(52) U.S. Cl.
CPC .............. *G06F 30/20* (2020.01); *E21B 41/00* (2013.01); *G01V 3/20* (2013.01); *E21B 2200/20* (2020.05); *G06F 2113/08* (2020.01)

(58) Field of Classification Search
CPC ...... G06F 30/20; G06F 2113/08; E21B 41/00; G01V 3/20
USPC .......................................................... 703/10
See application file for complete search history.

(56) References Cited

U.S. PATENT DOCUMENTS

| | | | |
|---|---|---|---|
| 3,638,484 A | 2/1972 | Tixier | |
| 4,393,486 A * | 7/1983 | Thompson | G01V 1/50 367/75 |
| 5,497,321 A * | 3/1996 | Ramakrishnan | G01V 3/38 702/12 |
| 5,869,755 A | 2/1999 | Ramamoorthy et al. | |
| 5,992,228 A | 11/1999 | Dunham | |
| 6,255,819 B1 | 7/2001 | Day et al. | |
| 6,714,871 B1 * | 3/2004 | Xu | G01N 15/088 702/6 |
| 7,133,779 B2 | 11/2006 | Tilke et al. | |
| 7,277,795 B2 | 10/2007 | Boitnott | |
| 8,311,788 B2 | 11/2012 | Hurley et al. | |
| 8,725,477 B2 | 5/2014 | Zhang et al. | |

(Continued)

OTHER PUBLICATIONS

Li et al. (Automatic fracture-vug identification and extraction from electric imaging logging data based on path morphology, Petroleum Science (2019) 16:58-76) (Year: 2019).*

(Continued)

*Primary Examiner* — Iftekhar A Khan

(74) *Attorney, Agent, or Firm* — Osha Bergman Watanabe & Burton LLP

(57) ABSTRACT

A method of determining a validated vug interpretation log for performing a reservoir fluid flow simulation is disclosed. The method including obtaining a set of well logs from a wellbore, where at least one of the set of well logs may be used as a validating resistivity log, producing an initial vug interpretation log based on at least one of the well logs, and determining a scaled resistivity log from the validating resistivity log The method further includes determining a validated vug interpretation log based, at least in part, on the scaled resistivity log and the initial vug interpretation log; and performing a reservoir fluid flow simulation based, at least in part, on the validated vug interpretation log.

12 Claims, 6 Drawing Sheets

(56) References Cited

U.S. PATENT DOCUMENTS

| | | | | |
|---|---|---|---|---|
| 10,429,535 | B2* | 10/2019 | Heaton | G01V 3/32 |
| 10,502,858 | B2 | 12/2019 | Zhang et al. | |
| 11,010,629 | B2* | 5/2021 | Feng | G06N 20/00 |
| 11,131,184 | B1* | 9/2021 | Alali | E21B 47/12 |
| 11,520,070 | B2* | 12/2022 | Homan | E21B 49/00 |
| 11,525,352 | B2* | 12/2022 | Al Ismail | E21B 49/00 |
| 11,867,052 | B1* | 1/2024 | McCauley | G01V 5/12 |
| 12,084,956 | B2* | 9/2024 | Aljedaani | E21B 21/08 |
| 2006/0015258 | A1* | 1/2006 | Dubourg | G01V 3/20 |
| | | | | 702/11 |
| 2007/0119244 | A1* | 5/2007 | Goodwin | E21B 49/10 |
| | | | | 73/152.28 |
| 2009/0110242 | A1* | 4/2009 | Touati | G01N 15/088 |
| | | | | 382/109 |
| 2010/0305863 | A1* | 12/2010 | Abubakar | G01V 11/00 |
| | | | | 702/7 |
| 2015/0008927 | A1* | 1/2015 | Cheung | G01V 3/26 |
| | | | | 324/339 |
| 2015/0023564 | A1* | 1/2015 | Hruska | G06T 7/40 |
| | | | | 382/109 |
| 2015/0041123 | A1* | 2/2015 | Troshko | E21B 43/16 |
| | | | | 166/305.1 |
| 2015/0234069 | A1* | 8/2015 | Ramakrishnan | G01V 1/50 |
| | | | | 702/6 |
| 2015/0241591 | A1* | 8/2015 | Burmester | G01V 11/00 |
| | | | | 702/7 |
| 2015/0356403 | A1* | 12/2015 | Storm, Jr. | E21B 49/005 |
| | | | | 706/12 |
| 2017/0328847 | A1* | 11/2017 | Hursan | G01V 3/32 |
| 2018/0003853 | A1 | 1/2018 | Ewe et al. | |
| 2018/0196897 | A1* | 7/2018 | Filippov | G06F 7/00 |
| 2018/0335541 | A1* | 11/2018 | Donderici | G01V 20/00 |
| 2019/0034812 | A1* | 1/2019 | Borrel | G06N 20/00 |
| 2019/0113650 | A1* | 4/2019 | Guner | G01V 3/38 |
| 2019/0219558 | A1* | 7/2019 | Villar De Andrade E Silva | |
| | | | | G01N 33/2823 |
| 2020/0065606 | A1* | 2/2020 | Feng | G06V 10/82 |
| 2020/0065620 | A1* | 2/2020 | Feng | G06N 3/045 |
| 2020/0265615 | A1* | 8/2020 | Di Santo | E21B 49/00 |
| 2020/0301036 | A1* | 9/2020 | Ramfjord | E21B 7/04 |
| 2021/0102457 | A1* | 4/2021 | Dupont | E21B 47/04 |
| 2021/0149069 | A1* | 5/2021 | Lin | G01V 1/345 |
| 2021/0165125 | A1* | 6/2021 | Tabarovsky | G06F 30/20 |
| 2021/0239869 | A1* | 8/2021 | Beam | G06F 9/5061 |
| 2022/0099544 | A1* | 3/2022 | Amanullah | G01N 33/2823 |
| 2022/0252756 | A1* | 8/2022 | Haceb | E21B 49/00 |
| 2022/0252757 | A1* | 8/2022 | Alanazi | G06T 7/60 |
| 2023/0003118 | A1* | 1/2023 | AlTammar | E21B 44/00 |
| 2023/0063424 | A1* | 3/2023 | Zeghlache | G06N 3/045 |
| 2023/0342517 | A1* | 10/2023 | Mansor | E21B 41/00 |
| 2024/0084688 | A1* | 3/2024 | Tarabbia | E21B 47/022 |
| 2024/0102380 | A1* | 3/2024 | Dupont | E21B 41/00 |

OTHER PUBLICATIONS

Xu et al. (Evaluation of fractured-vuggy reservoir by electrical imaging logging based on a de-noising method, Acta Geophysica ( 2021) 69:761-772) (Year: 2021).*

J. Doveton and L. Watney; "Textural and pore size analysis of carbonates from inegrated core and nuclear magnetic resonance logging: An Arbuckle study", Interpretation; vol. 3; No. 1; Feb. 2015; pp. SA77-SA99 (13 pages).

B.M. Newberry et al.; "Analysis of Carbonate Dual Porosity Systems from Borehole Electrical Images", SPE 35158; Society of Petroleum Engineers; Mar. 27, 1996; pp. 123-129 (7 pages).

G. Asquith and D. Krygowski; "Basic Relationships of Well Log Interpretation", Basic Well Log Analysis; American Association of Petroleum Geologists; vol. 16; Ch. 1; Jan. 1, 2004; pp. 1-20 (20 pages).

R. A. Victor; "Multiscale, image-based interpretation of well logs acquired in a complex, deepwater carbonate reservoir", Doctoral dissertation, The University of Texas at Austin; UT Electronic Theses and Dissertations; May 2017 (240 pages).

Office Action issued by the Saudi Arabian Patent Office for corresponding Saudi Arabian patent application No. 123446982, mailed Mar. 23, 2025 (9 pages).

* cited by examiner

METHOD FOR VALIDATING NON-MATRIX VUG FEATURES IN SUBTERRANEAN ROCKS

BACKGROUND

Vugs are cavities, voids or large pores in a rock that are commonly lined with mineral precipitates. Vugs are commonly the result of dissolution processes that may be associated with factors such as pressure, temperature and fluid chemistry. This type of dissolution may alter the original rock fabric and create void spaces in the rock. Such vugs may vary in size, from millimeter to multi-meter scale. Vugs may improve the storage capacity and production quality of the rock.

When planning a wellbore path, knowledge of the presence of vugs may be key to drilling a successful well. However, relying on the current methods of vug interpretation may not provide reliable results. Therefore, there exists a need to improve current vug interpretation methods.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method which includes obtaining a set of well logs from a wellbore with at least one of the set of well logs forming a validating resistivity log, producing an initial vug interpretation log based on at least one of the well logs, and determining a scaled resistivity log from the validating resistivity log. The method further includes determining a validated vug interpretation log based on the scaled resistivity log and the initial vug interpretation log, and performing a reservoir fluid flow simulation based on the validated vug interpretation log.

In one aspect, embodiments disclosed herein relate to a non-transitory computer readable medium storing a set of instructions executable by a computer processor. The set of instructions includes functionality for receiving a set of well logs from a wellbore, with at least one of the well logs forming a validating resistivity log, producing an initial vug interpretation log based on at least one of the well logs, and determining a scaled resistivity log from the validating resistivity log. The set of instructions further including functionality for determining a validated vug interpretation log based on the scaled resistivity log and the initial vug interpretation log, and performing a reservoir fluid flow simulation based on the validated vug interpretation log.

In one aspect, embodiments disclosed herein relate to a system including a logging system, a computer processor, configured to receive a set of well logs from a wellbore, with at least one of the well logs forming a validating resistivity log, produce an initial vug interpretation log based on at least one of the well logs, and determine a scaled resistivity log from the validating resistivity log. The computer processor is further configured to determine a validated vug interpretation log based on the scaled resistivity log and the initial vug interpretation log, and perform a reservoir fluid flow simulation based on the validated vug interpretation log. The system further includes a wellbore path planning system, configured to determine a wellbore path based, at least in part, on the reservoir fluid flow simulation.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e. g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-6, any component described with regard to a figure, in various embodiments disclosed herein, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "a resistivity log" includes reference to one or more of such resistivity logs.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

Figure 1:
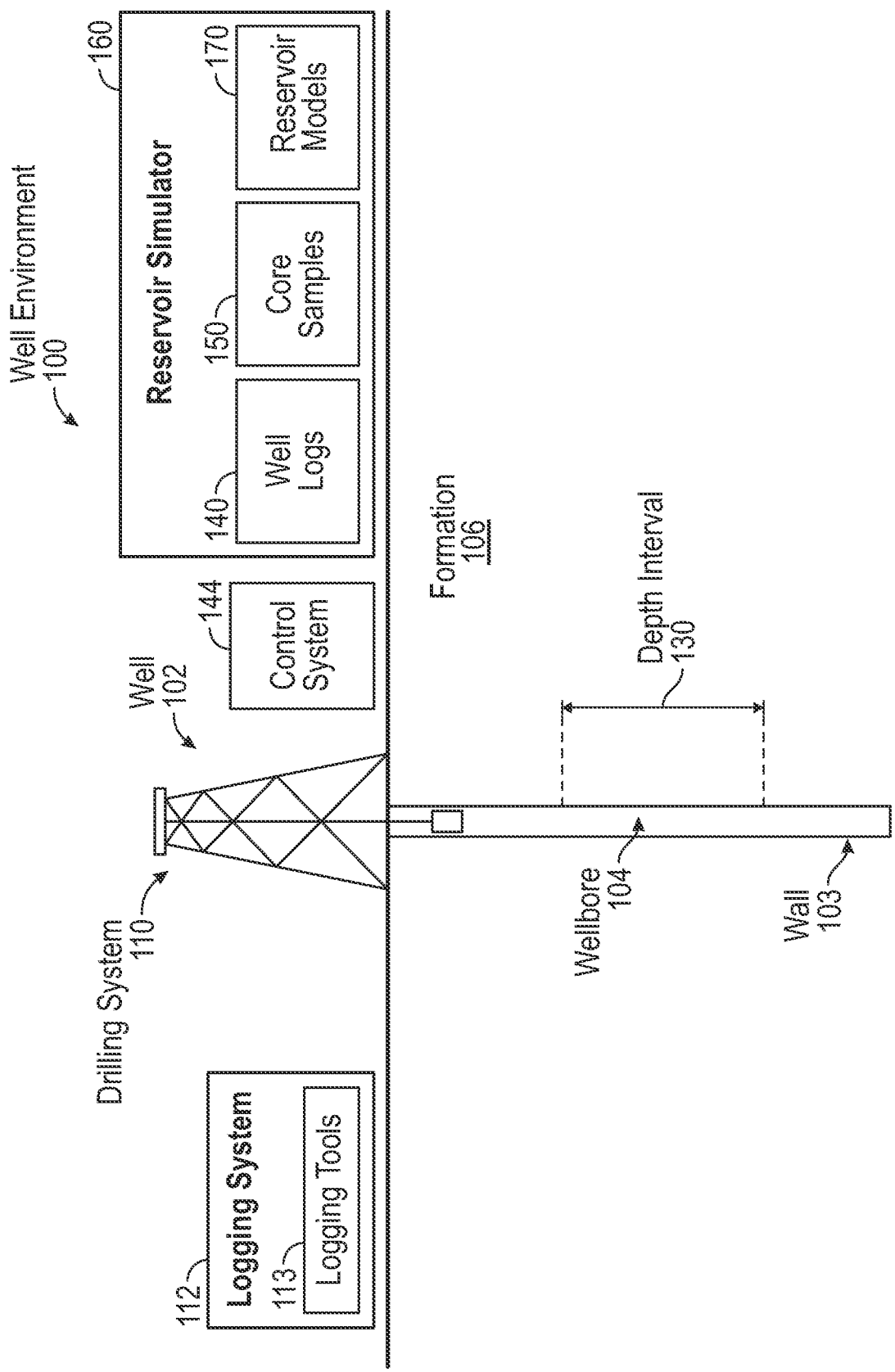
FIG. 1 shows a schematic of a well environment in accordance with one or more embodiments.

FIG. 1 shows a schematic diagram in accordance with one or more embodiments. FIG. 1 illustrates a well environment (100) that may include a well (102) with a wall (103) having a wellbore (104) extending into a formation (106). The wellbore (104) may include a bored hole that extends from the surface into a target zone of the formation (106), such as a reservoir (not shown). The formation (106) may include various formation characteristics of interest, such as formation porosity, formation permeability, resistivity, water saturation, and free water level (FWL). Porosity may indicate how much void space exists in a particular rock within an area of interest in the formation (106), where oil, gas or water may be trapped. The void space may be vugs which create vugular porosity. Permeability may indicate the ability of liquids and gases to flow through the rock within the area of interest. Resistivity may indicate how strongly rock or fluid within the formation (106) opposes the flow of electrical current. For example, resistivity may be indicative of the porosity of the formation (106) and the presence of hydrocarbons. More specifically, resistivity may be relatively low for a formation that has high porosity and a large amount of water, and resistivity may be relatively high for a formation that has low porosity or includes a large amount of hydrocarbons. Water saturation may indicate the fraction of water in a given pore space.

Keeping with FIG. 1, the well environment (100) may include a drilling system (110), a logging system (112), a control system (144), and a reservoir simulator (160). The drilling system (110) may include a drill string, drill bit or a mud circulation system for use in boring the wellbore (104) into the formation (106). The control system (144) may include hardware or software for managing drilling operations or maintenance operations. For example, the control system (144) may include one or more programmable logic controllers (PLCs) that include hardware or software with functionality to control one or more processes performed by the drilling system (110). Specifically, a programmable logic controller may control valve states, fluid levels, pipe pressures, warning alarms, or pressure releases throughout a drilling rig. In particular, a programmable logic controller may be a ruggedized computer system with functionality to withstand vibrations, extreme temperatures (for example, -575° C.), wet conditions, or dusty conditions, for example, around a drilling rig. Without loss of generality, the term "control system" may refer to a drilling operation control system that is used to operate and control the equipment, a drilling data acquisition and monitoring system that is used to acquire drilling process and equipment data and to monitor the operation of the drilling process, or a drilling interpretation software system that is used to analyze and understand drilling events and progress.

The logging system (112) may include one or more logging tools (113), such as a nuclear magnetic resonance (NMR) logging tool or a resistivity logging tool, for use in generating well logs (140) of the formation (106). For example, a logging tool may be lowered into the wellbore (104) to acquire measurements as the tool traverses a depth interval (130) (for example, targeted reservoir section) of the wellbore (104). The plot of the logging measurements versus depth may be referred to as a "log" or "well log". Well logs (140) may provide depth measurements of the well (102) that describe such reservoir characteristics as formation porosity, formation permeability, resistivity, water saturation, and the like. The resulting logging measurements may be stored or processed or both, for example, by the control system (144), to generate corresponding well logs (140) for the well (102). A well log may include, for example, a plot of a logging response time versus true vertical depth (TVD) across the depth interval (130) of the wellbore (104).

Reservoir characteristics may be determined using a variety of different techniques. For example, certain reservoir characteristics can be determined via coring (for example, physical extraction of rock samples) to produce core samples (150) or logging operations (for example, wireline logging, logging-while-drilling (LWD) and measurement-while-drilling (MWD)). Coring operations may include physically extracting a rock sample from a region of interest within the wellbore (104) for detailed laboratory analysis. For example, when drilling an oil or gas well, a coring bit may cut plugs (or "cores") from the formation (106) and bring the plugs to the surface, and these core samples may be analyzed at the surface (for example, in a lab) to determine various characteristics of the formation (106) at the location where the sample was obtained. One example of a reservoir characteristic is the amount of oil present in the reservoir, and monitoring or observing the depletion of oil from the reservoir. Reservoir monitoring is an operation involving the mapping of fluid movements within the reservoir as a consequence of oil production.

Multiple types of logging techniques are available for determining various reservoir characteristics, and a particular form of logging may be selected and used based on the logging conditions and the type of desired measurements. For example, NMR logging measures the induced magnetic moment of hydrogen nuclei (that is, protons) contained within the fluid-filled pore space of porous media (for example, reservoir rocks). Thus, NMR logs may measure the magnetic response of fluids present in the pore spaces of the reservoir rocks. In so doing, NMR logs may measure both porosity and permeability as well as the types of fluids present in the pore spaces. For determining permeability, another type of logging may be used that is called spontaneous potential (SP) logging. SP logging may determine the permeabilities of rocks in the formation (106) by measuring the amount of electrical current generated between a drilling fluid produced by the drilling system (110) and formation water that is present in pore spaces of the reservoir rock. Porous sandstones with high permeabilities may generate more electricity than impermeable shales. Thus, SP logs may be used to identify sandstones from shales.

To determine porosity in the formation (106), various types of logging techniques may be used. For example, the logging system (112) may measure the speed that acoustic waves travel through rocks in the formation (106). This type of logging may generate borehole compensated (BHC) logs, which are also called sonic logs and acoustic logs. In general, sound waves may travel faster through shales than through sandstones because shales generally have greater density than sandstones. Likewise, density logging may also determine porosity measurements by directly measuring the density of the rocks in the formation (106). In addition, neutron logging may determine porosity measurements by assuming that the reservoir pore spaces within the formation (106) are filled with either water or oil and then measuring the amount of hydrogen atoms (that is, neutrons) in the pores. Furthermore, the logging system (112) may determine geological data for the well (102) by measuring corresponding well logs (140) and data regarding core samples (150) for the well (102).

Keeping with the various types of logging techniques, resistivity logging may measure the electrical resistivity of rock or sediment in and around the wellbore (104). In particular, resistivity measurements may determine what types of fluids are present in the formation (106) by measuring how effective these rocks are at conducting electricity. Because fresh water and oil are poor conductors of electricity, they have high relative resistivities. For example, an electrical resistivity of oil ranges from $4.5 \times 10^6$ to $1.5 \times 10^8$ ohm-meter and the electrical resistivity of fresh water aquifers is in the range of 10-100 ohm-meter. As such, resistivity measurements obtained via such logging can be used to determine corresponding reservoir water saturation ($S_w$).

Turning to the reservoir simulator (160), the reservoir simulator (160) comprises functionality for simulating the flow of fluids, including hydrocarbon fluids such as oil and gas, through a hydrocarbon reservoir composed of porous, permeable reservoir rocks in response to natural and anthropogenic pressure gradients. The reservoir simulator may be used to predict changes in fluid flow, including fluid flow into well penetrating the reservoir as a result of planned well drilling, and fluid injection and extraction. For example, the reservoir simulator may be used to predict changes in hydrocarbon production rate that would result from the injection of water into the reservoir from wells around the reservoirs periphery.

The reservoir simulator may use a reservoir model (170) that contains a digital description of the physical properties of the rocks as a function of position within the reservoir and the fluids within the pores of the porous, permeable reservoir rocks at a given time. In some embodiments, the digital description may be in the form of a dense 3D grid with the physical properties of the rocks and fluids defined at each node. In some embodiments, the 3D grid may be a cartesian grid, while in other embodiments the grid may be an irregular grid.

The physical properties of the rocks and fluids within the reservoir may be obtained from a variety of geological and geophysical sources. For example, remote sensing geophysical surveys, such as seismic surveys, gravity surveys, and active and passive source resistivity surveys, may be employed. In addition, data collected such as well logs, core data, production data as previously discussed, acquired in wells penetrating the reservoir may be used to determine physical and petrophysical properties along the segment of the well trajectory traversing the reservoir. For example, porosity, permeability, density, seismic velocity, and resistivity may be measured along these segments of wellbore. In accordance with some embodiments, remote sensing geophysical surveys and physical and petrophysical properties determined from well logs may be combined to estimate physical and petrophysical properties for the entire reservoir simulation model grid.

Reservoir simulators solve a set of mathematical governing equations that represent the physical laws that govern fluid flow in porous, permeable media. For example, the flow of a single-phase slightly compressible oil with a constant viscosity and compressibility the equations capture Darcy's law, the continuity condition and the equation of state and may be written as:

$$\nabla^2 p(x, t) = \frac{\varphi \mu c_t}{k} \frac{\partial p(x, t)}{\partial t}$$

where p represents fluid in the reservoir, x is a vector representing spatial position and t represents time. $\varphi$, $\mu$, $c_t$, and k represent the physical and petrophysical properties of porosity, fluid viscosity, total combined rock and fluid compressibility, and permeability, respectively. $\nabla^2$ represents the spatial Laplacian operator.

Additional, and more complicated equations are required when more than one fluid, or more than one phase, e.g., liquid and gas, are present in the reservoir. Further, when the physical and petrophysical properties of the rocks and fluids vary as a function of position the governing equations may not be solved analytically and must instead be discretized into a grid of cells or blocks. The governing equations must then be solved by one of a variety of numerical methods, such as, without limitation, explicit or implicit finite-difference methods, explicit or implicit finite element methods, or discrete Galerkin methods.

Figure 2A:
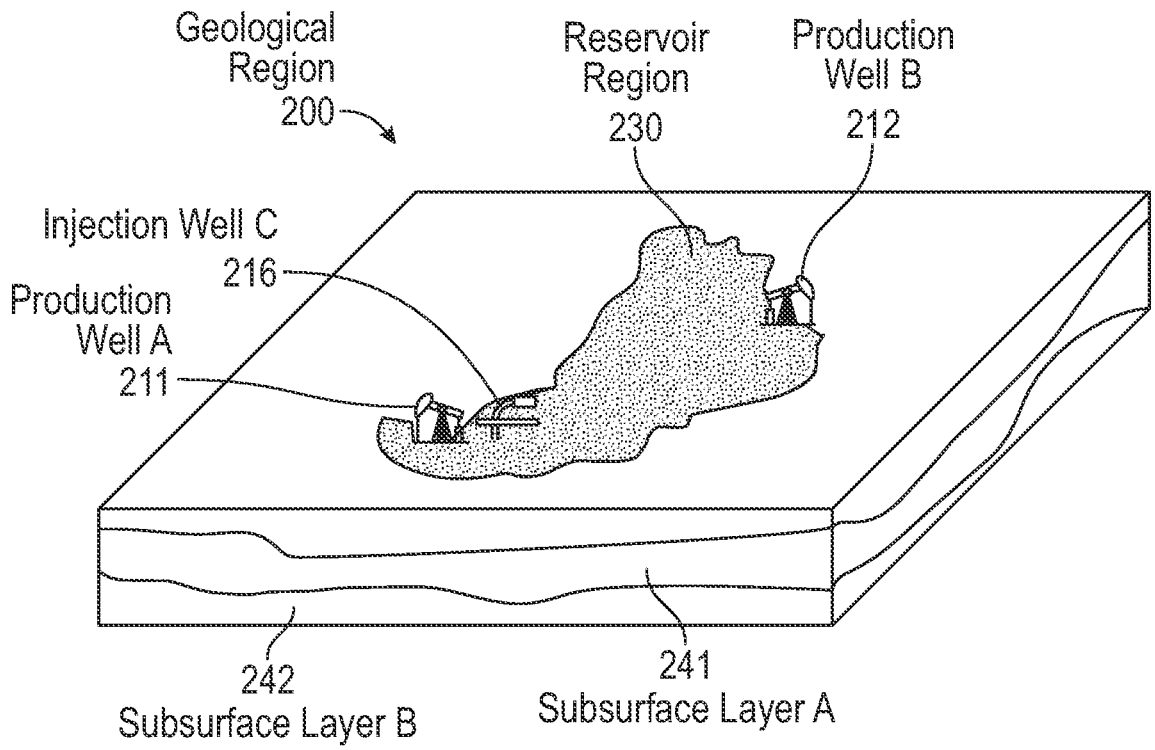
FIG. 2A shows a schematic diagram of a region of interest in accordance with one or more embodiments.

FIG. 2A shows a schematic diagram in accordance with one or more embodiments. More specifically, FIG. 2A shows a geological region (200) that may include one or more reservoir regions (e.g., reservoir region (230)) with various production wells (e.g., production well A (211), production well B (212)). Likewise, a reservoir region may also include one or more injection wells (e.g., injection well C (216)) that include functionality for enhancing production by one or more neighboring production wells. As shown in FIG. 2A, wells may be disposed in the reservoir region (230) above various subsurface layers (e.g., subsurface layer A (241), subsurface layer B (242)), which may include hydrocarbon deposits. Production data and/or injection data may exist for a particular well, where production data may include data that describes production or production operations at a well such as a record of measurements of wellhead pressure ($P_{wh}$) (e.g., including flowing wellhead pressure), wellhead temperature ($T_{wh}$) (e.g., including flowing wellhead temperature), wellhead production rate ($Q_{wh}$) over some or all of the life of the well, and water cut data.

Figure 2B:
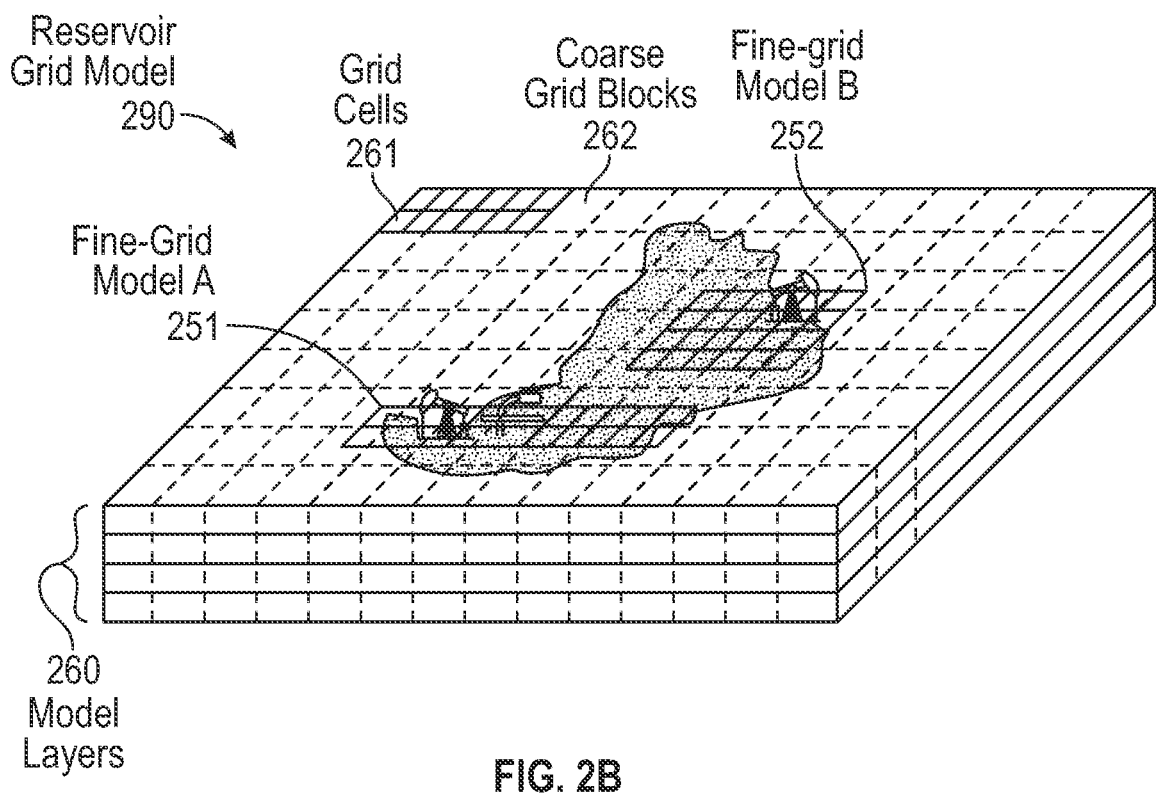
FIG. 2B shows a schematic diagram of a reservoir grid model in accordance with one or more embodiments.

Turning to FIG. 2B, FIG. 2B shows a schematic diagram in accordance with one or more embodiments. More specifically, FIG. 2B shows a reservoir grid model (290) that corresponds to the geological region (200) from FIG. 2A. More specifically, the reservoir grid model (290) includes grid cells (261) that may refer to an original cell of a reservoir grid model as well as coarse grid blocks (262) that may refer to an amalgamation of original cells of the reservoir grid model. For example, a grid cell may be the case of a 1×1 block, where coarse grid blocks may be of sizes 2×2, 4×4, 8×8, etc. Both the grid cells (261) and the coarse grid blocks (262) may correspond to columns for multiple model layers (260) within the reservoir grid model (290).

Prior to performing a reservoir simulation, local grid refinement and coarsening (LGR) may be used to increase or decrease grid resolution in a certain area of reservoir grid model. For example, various reservoir properties, e.g., permeability, porosity or saturations, may correspond to a discrete value that is associated with a particular grid cell or coarse grid block. However, by using discrete values to represent a portion of a geological region, a discretization error may occur in a reservoir simulation. Thus, finer grids may reduce discretization errors as the numerical approximation of a finer grid is closer to the exact solution, however through a higher computational cost. As shown in FIG. 2B, for example, the reservoir grid model (290) may include various fine-grid models (i.e., fine-grid model A (251), fine-grid model B (252)), that are surrounded by coarse block regions. Likewise, the original reservoir grid model without any coarsening may also be a fine-grid model. In some embodiments, a reservoir grid model (or multiple reservoir grid models) may be used to preform reservoir simulations.

Figure 3:
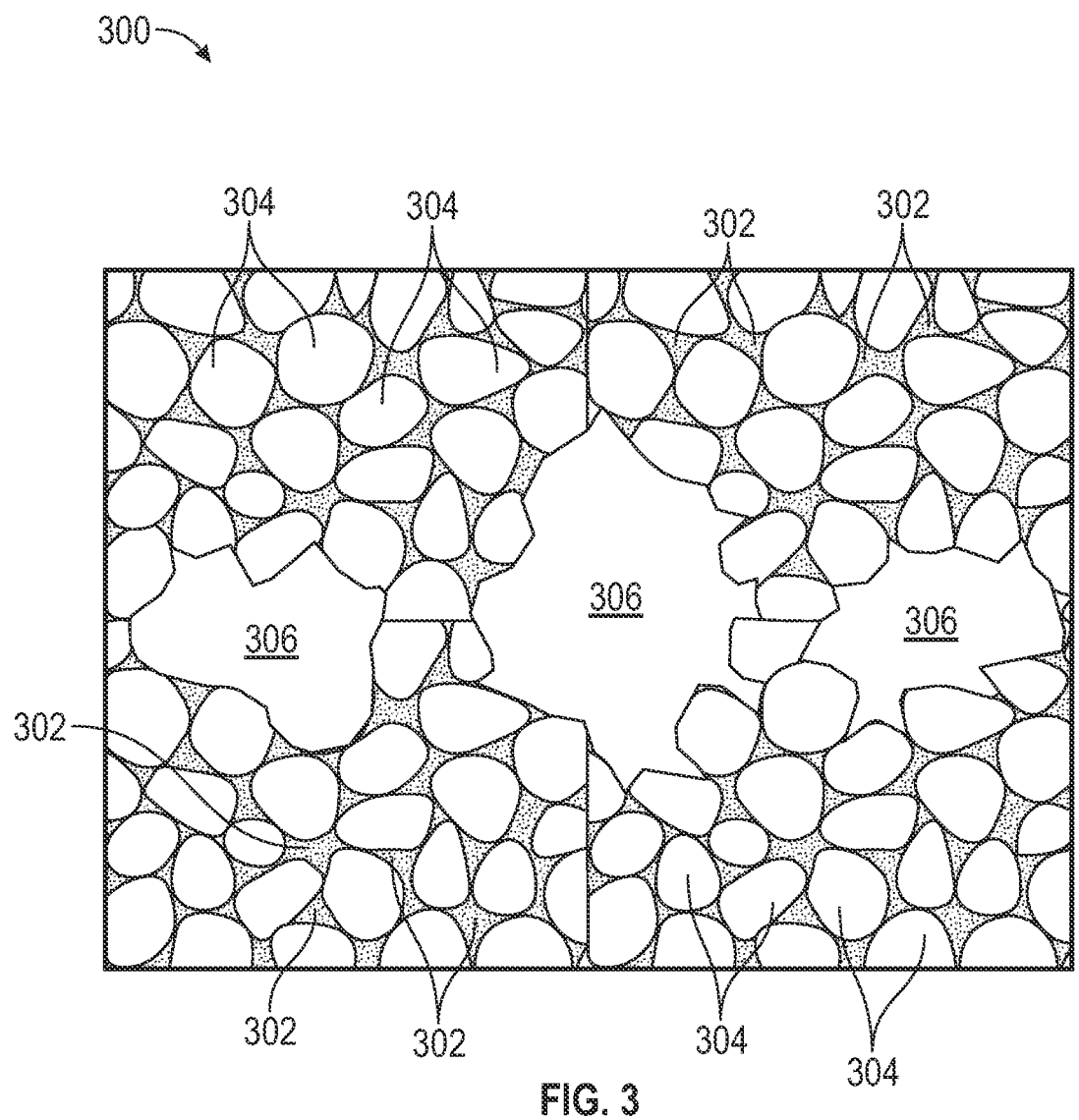
FIG. 3 illustrates a 2D cross-section of vugs in accordance with one or more embodiments.

FIG. 3 illustrates a 2D cross-section of a porous medium (300) that has a plurality of pores (302) and vugular spaces, i.e., vugs (306) within a matrix of rock grains (304). In general, a pore is a void within a porous material that may be filled with a fluid. Porosity is the fraction of a rock sample occupied by pores and may be expressed as a percentage. A vug (typically visible to the naked eye) may be a large void often equant in shape and larger than other pores within the rock. Vugs may vary in size from only slightly larger than the grain size of the rock matrix to cavern size. As such, vugs may contribute substantially to the behavior of a reservoir grid model. Therefore, identifying and validating the presence of vugs is essential to reliable reservoir fluid flow simulations.

Figure 4:
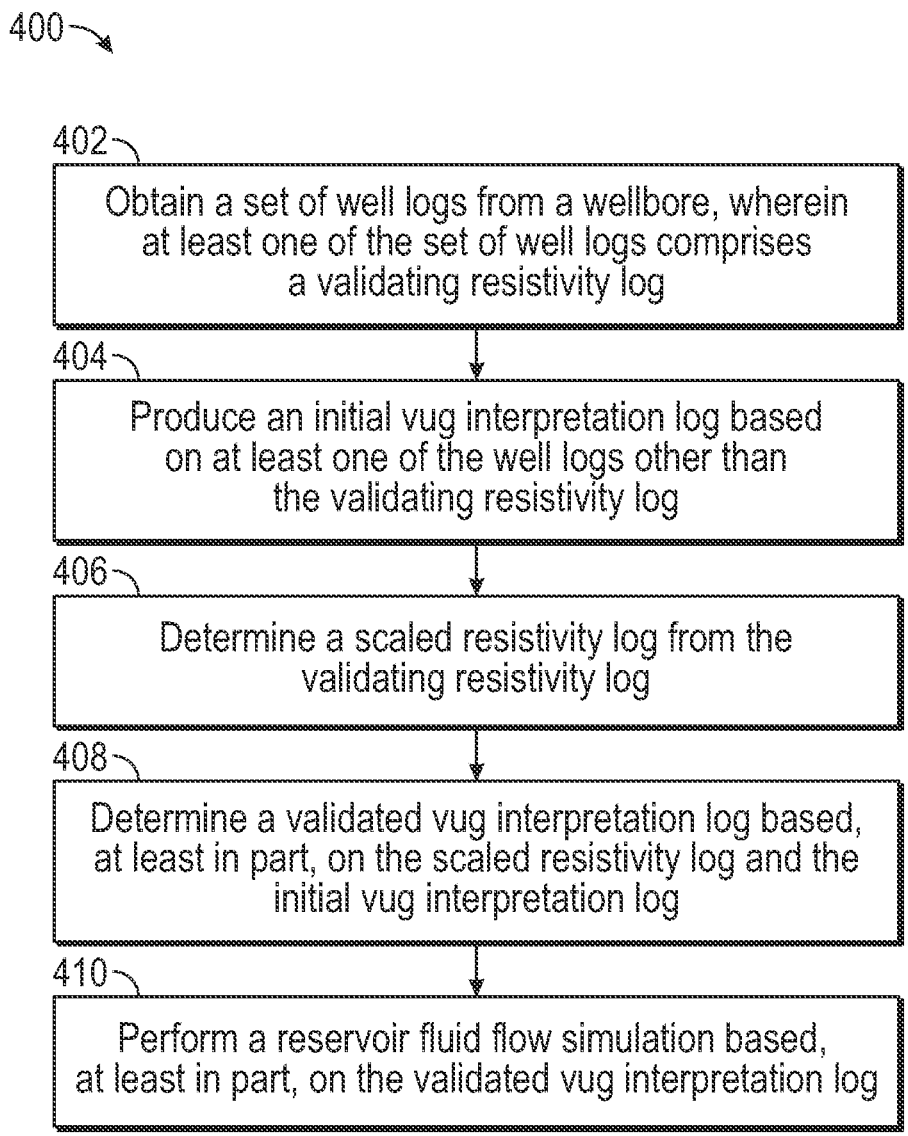
FIG. 4 shows a flowchart in accordance with one or more embodiments.

FIG. 4 shows a flowchart (400) in accordance with one or more embodiments. In Step 402, a set of well logs may be obtained from a wellbore. At least one of the well logs may be a validating resistivity log. In particular, the validating resistivity log may be a shallow resistivity log. The well logs may include many types of data such as caliper, bit size, gamma-ray, resistivity, density, neutron porosity/density, sonic, nuclear magnetic resonance (NMR), and borehole imaging (e.g., ultrasonic or electrical) logs. The well log data may be supplemented by core sample data that may include whole core and/or core plugs that may undergo various types of analysis (such as CT X-ray analysis) to ascertain their petrophysical characteristics.

In accordance with one or more embodiments, in Step 404 an initial vug interpretation log may be produced based on at least one of the well logs other than the validating resistivity log. In some embodiments, the initial vug interpretation log may be produced from an electrical image log of a wellbore wall. The initial vug interpretation log may be given in, or converted to, a fractional volume. Further, the initial vug interpretation log may include a linear scaling of the fractional volume of vugs. The scale range may be, for example, 0.0 to 0.2. Alternatively, the initial vug interpretation log may be determined using ultrasonic borehole images, NMR porosimeter images, wellbore acoustic measurements, core images, visual identification in core samples, and/or analysis of CT images of cores, without deviating from the scope disclosed herein.

In accordance with one or more embodiments, in Step 406 a scaled resistivity log may be determined from the validating resistivity log. In one embodiment the scaled resistivity log may be based on the logarithm of the validating resistivity log. In some embodiments the values of the validating resistivity log may be in the range of 0.5 to 1950 ohms-meters. The scaled resistivity log may be scaled to lie in a range from −0.3 to 3.3 ohm-meters. In other embodiments the scaled resistivity log may be based on the natural logarithm of the validating resistivity log and lie in a range from −0.7 to 7.6 ohm-meters. The scaled resistivity log ranges may be selected dependent on a variety of factors such as rock type, mineralogy, formation fluid chemistry, and drilling fluid chemistry.

In accordance with one or more embodiments, in Step 408 a validated vug interpretation log may be determined based, at least in part, on the scaled resistivity log and the initial vug interpretation log. The validated vug interpretation log may be calculated using a ratio of the scaled resistivity log to the initial vug interpretation log and comparing the calculated ratio to a predetermined value of the ratio. The validated vug interpretation log may have depth portions where the value of the fractional vug volume is accepted. The validated vug interpretation log may have depth portions where the value of the fractional vug volume is rejected or assigned a warning flag. The accepted portions of the validated vug interpretation log may have a ratio of the scaled resistivity log to the initial vug interpretation log greater or less than a predetermined value of the ratio. For example, if a predetermined value of 1 is selected, in the depth portions where the ratio is greater than 1 the value of the initial vug interpretation log may be accepted in the validated vug interpretation log. The predetermined value of the ratio may be selected based on a variety of factors such as rock type, mineralogy, formation fluid chemistry, drilling fluid chemistry, drilling experience, or another log (or combination of logs).

In accordance with one or more embodiments, in Step 410 a reservoir fluid flow simulation may be performed based, at least in part, on the validated vug interpretation log. The validated vug interpretation log may enable a more accurate or reliable inclusion or exclusion of zones of vugular porosity in the reservoir model (170). The reservoir model (170) may be used to influence the planned wellbore path for the drilling system.

Figure 5:
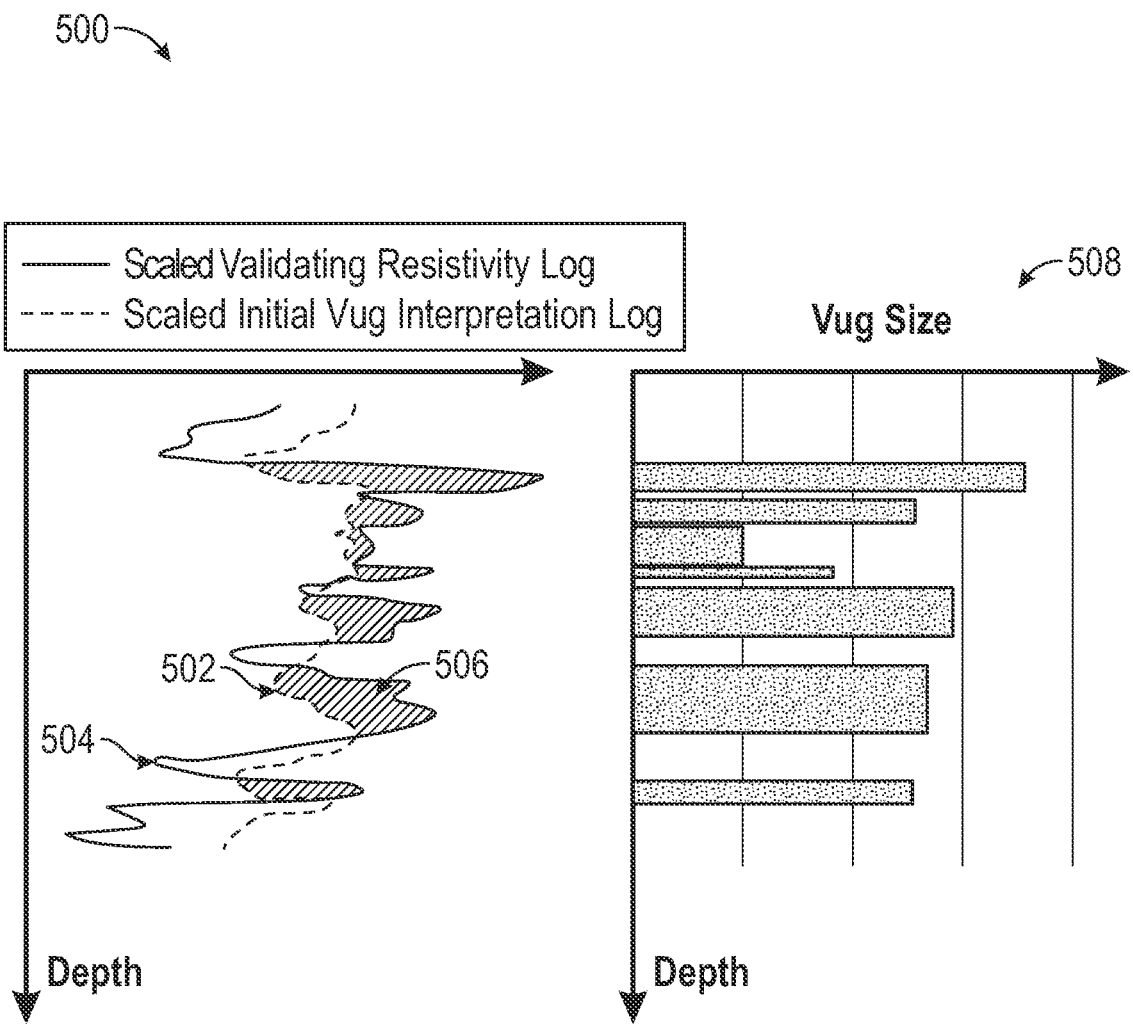
FIG. 5 provides an example output in accordance with one or more embodiments.

FIG. 5 provides an example output (500) in accordance with one or more embodiments. A scaled initial vug interpretation log (502) is overlain by a scaled validating resistivity log (504). The zones where the ratio between the scaled shallow resistivity log and the scaled initial vug interpretation log is greater than 1 are shaded (506). The crossover zones indicate a validation of the initial vug interpretation. The vug size column (508) shows an interpretation from rock samples, (i.e., cores) based on a physical count and measure of vugs in the cores. The vug size in this example may range from 0 to greater than 2 cm.

The validated vug interpretation log may be used, together with other available information, to determine the location of a hydrocarbon reservoir within a subterranean region of interest with a high degree of certainty. Further the validated vug interpretation log may be used to determine locations within a hydrocarbon reservoir for which wellbores may be drilled, safely and economically, to produce the hydrocarbons.

Prior to the commencement of drilling, a wellbore plan may be generated. The wellbore plan may include a starting surface location of the wellbore, or a subsurface location within an existing wellbore, from which the wellbore may be drilled. Further, the wellbore plan may include a terminal location that may intersect with the targeted hydrocarbon bearing formation and a planned wellbore path from the starting location to the terminal location.

Typically, the wellbore plan is generated based on best available information from a geophysical model, geomechanical models encapsulating subterranean stress conditions, the trajectory of any existing wellbores (which it may be desirable to avoid), and the existence of other drilling hazards, such as shallow gas pockets, over-pressure zones, and active fault planes. Furthermore, the wellbore plan may take into account other engineering constraints such as the maximum wellbore curvature ("dog-leg") that the drillstring may tolerate and the maximum torque and drag values that the drilling system may tolerate.

A wellbore planning system may be used to generate the wellbore plan. The wellbore planning system may comprise one or more computer processors in communication with computer memory containing the geophysical and geomechanical models, information relating to drilling hazards, and the constraints imposed by the limitations of the drillstring and the drilling system. The wellbore planning system may further include dedicated software to determine the planned wellbore path and associated drilling parameters, such as the planned wellbore diameter, the location of planned changes of the wellbore diameter, the planned depths at which casing will be inserted to support the wellbore and to prevent formation fluids entering the wellbore, and the mud weights (densities) and types that may be used during drilling the wellbore.

Figure 6:
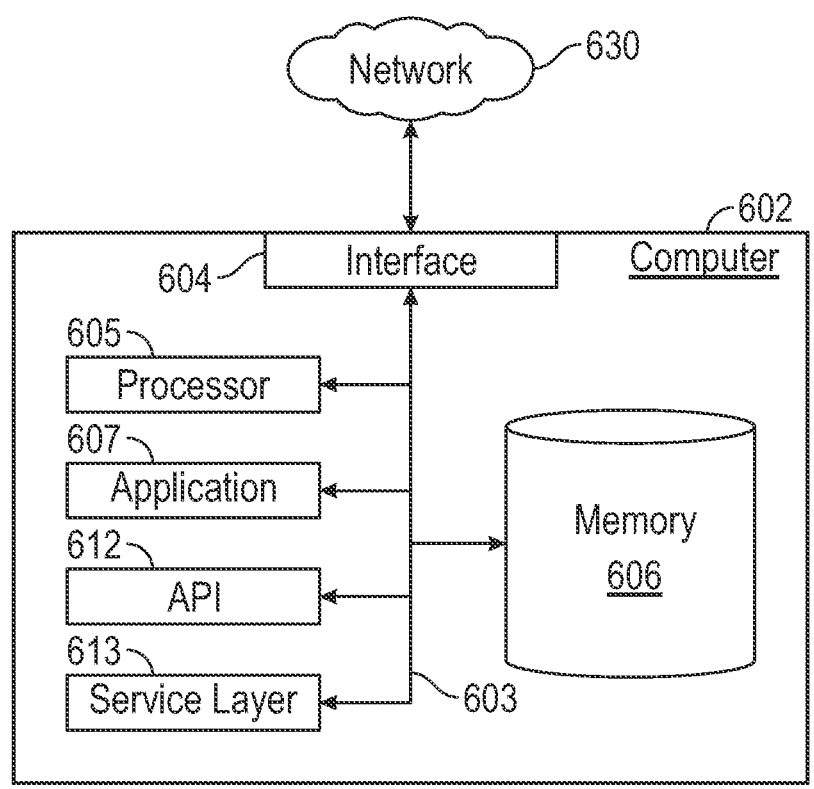
FIG. 6 shows a computer in accordance with one or more embodiments.

FIG. 6 depicts a block diagram of the computer (602) used to provide computational functionalities associated with described algorithms, methods, functions, processes, flows, and procedures as described in this disclosure, according to one or more embodiments. The illustrated computer (602) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (602) may include a computer that includes an input device, such as a keypad, keyboard, touch screen, or other device that can accept user information, and an output device that conveys information associated with the operation of the computer (602), including digital data, visual, or audio information (or a combination of information), or a Graphical User Interface (GUI).

The computer (602) can serve in a role as a client, network component, a server, a database or other persistency, or any other component (or a combination of roles) of a computer system for performing the subject matter described in the instant disclosure. The illustrated computer (602) is communicably coupled with a network (630). In some implementations, one or more components of the computer (602) may be configured to operate within environments, including cloud-computing-based, local, global, or other environment (or a combination of environments).

At a high level, the computer (602) is an electronic computing device operable to receive, transmit, process, store, or manage data and information associated with the described subject matter. According to some implementations, the computer (602) may also include or be communicably coupled with an application server, e-mail server, web server, caching server, streaming data server, business intelligence (BI) server, or other server (or a combination of servers).

The computer (602) can receive requests over network (630) from a client application (for example, executing on another computer (602)) and responding to the received requests by processing the requests in an appropriate software application. In addition, requests may also be sent to the computer (602) from internal users (for example, from a command console or by other appropriate access method), external or third-parties, other automated applications, as well as any other appropriate entities, individuals, systems, or computers.

Each of the components of the computer (602) can communicate using a system bus (603). In some implementations, any or all of the components of the computer (602), both hardware or software (or a combination of hardware and software), may interface with each other or the interface (604) (or a combination of both) over the system bus (603) using an application programming interface (API) (612) or a service layer (613) (or a combination of the API (612) and service layer (613). The API (612) may include specifications for routines, data structures, and object classes. The API (612) may be either computer-language independent or dependent and refer to a complete interface, a single function, or even a set of APIs. The service layer (613) provides software services to the computer (602) or other components (whether or not illustrated) that are communicably coupled to the computer (602). The functionality of the computer (602) may be accessible for all service consumers using this service layer. Software services, such as those provided by the service layer (613), provide reusable, defined business functionalities through a defined interface. For example, the interface may be software written in JAVA, C++, or other suitable language providing data in extensible markup language (XML) format or another suitable format. While illustrated as an integrated component of the computer (602), alternative implementations may illustrate the API (612) or the service layer (613) as stand-alone components in relation to other components of the computer (602) or other components (whether or not illustrated) that are communicably coupled to the computer (602). Moreover, any or all parts of the API (612) or the service layer (613) may be implemented as child or sub-modules of another software module, enterprise application, or hardware module without departing from the scope of this disclosure.

The computer (602) includes an interface (604). Although illustrated as a single interface (604) in FIG. 6, two or more interfaces (604) may be used according to particular needs, desires, or particular implementations of the computer (602). The interface (604) is used by the computer (602) for communicating with other systems in a distributed environment that are connected to the network (630). Generally, the interface (604) includes logic encoded in software or hardware (or a combination of software and hardware) and operable to communicate with the network (630). More specifically, the interface (604) may include software supporting one or more communication protocols associated with communications such that the network (630) or interface's hardware is operable to communicate physical signals within and outside of the illustrated computer (602).

The computer (602) includes at least one computer processor (605). Although illustrated as a single computer processor (605) in FIG. 6, two or more processors may be used according to particular needs, desires, or particular implementations of the computer (602). Generally, the computer processor (605) executes instructions and manipulates data to perform the operations of the computer (602) and any algorithms, methods, functions, processes, flows, and procedures as described in the instant disclosure.

The computer (602) also includes a memory (606) that holds data for the computer (602) or other components (or a combination of both) that can be connected to the network (630). For example, memory (606) can be a database storing data consistent with this disclosure. Although illustrated as a single memory (606) in FIG. 6, two or more memories may be used according to particular needs, desires, or particular implementations of the computer (602) and the described functionality. While memory (606) is illustrated as an integral component of the computer (602), in alternative implementations, memory (606) can be external to the computer (602).

The application (607) is an algorithmic software engine providing functionality according to particular needs, desires, or particular implementations of the computer (602), particularly with respect to functionality described in this disclosure. For example, application (607) can serve as one or more components, modules, applications, etc. Further, although illustrated as a single application (607), the application (607) may be implemented as multiple applications (607) on the computer (602). In addition, although illustrated as integral to the computer (602), in alternative implementations, the application (607) can be external to the computer (602).

There may be any number of computers (602) associated with, or external to, a computer system containing computer (602), wherein each computer (602) communicates over network (630). Further, the term "client," "user," and other appropriate terminology may be used interchangeably as appropriate without departing from the scope of this disclosure. Moreover, this disclosure contemplates that many users may use one computer (602), or that one user may use multiple computers (602).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. A method comprising:
   obtaining a set of well logs from a wellbore, wherein at least one of the set of well logs comprises a validating resistivity log;
   producing an initial vug interpretation log based on at least one of the set of well logs other than the validating resistivity log;
   determining a scaled resistivity log from the validating resistivity log;
   determining a validated vug interpretation log by determining a resistivity ratio between the scaled resistivity log and the initial vug interpretation log, wherein one or more resistivity ratios among the validated vug interpretation log that are greater than a predetermined value indicate a depth location of a vug;
   performing a reservoir fluid flow simulation based on the validated vug interpretation log;
   updating a wellbore plan based on the reservoir fluid flow simulation, wherein the wellbore plan comprises a wellbore path; and
   further drilling, using a drilling system, the wellbore based on the wellbore plan and guided by the wellbore path.

2. The method of claim 1, wherein determining the scaled resistivity log comprises a logarithmic scaling of the validating resistivity log.

3. The method of claim 1, wherein producing the initial vug interpretation log comprises a linear scaling of a fractional volume of vugs of the initial vug interpretation log.

4. The method of claim 1, wherein the validating resistivity log comprises a shallow resistivity log.

5. The method of claim 1, wherein the initial vug interpretation log is produced from an electrical image log of a wall of the wellbore.

6. A system comprising:
   a logging system configured to obtain a set of well logs from a wellbore;
   a computer processor configured to:
      receive the set of well logs from the logging system, wherein at least one of the set of well logs comprises a validating resistivity log,
      produce an initial vug interpretation log based on at least one of the set of well logs other than the validating resistivity log,
      determine a scaled resistivity log from the validating resistivity log,
      determine a validated vug interpretation log by determining a resistivity ratio between the scaled resistivity log and the initial vug interpretation log, wherein one or more resistivity ratios among the validated vug interpretation log that are greater than a predetermined value indicate a depth location of a vug, and
      perform a reservoir fluid flow simulation based on the validated vug interpretation log;
   a wellbore path planning system configured to update a wellbore plan a based on the reservoir fluid flow simulation, wherein the wellbore plan comprises a wellbore path; and
   a drilling system configured to further drill the wellbore based on the wellbore plan and guided by the wellbore path.

7. The system according to claim 6, wherein determining the scaled resistivity log comprises a logarithmic scaling of the validating resistivity log.

8. The system according to claim 6, wherein producing the initial vug interpretation log comprises a linear scaling of a fractional volume of vugs of the initial vug interpretation log.

9. The system according to claim 6, wherein the validating resistivity log comprises a shallow resistivity log.

10. The system according to claim 6, wherein the initial vug interpretation log is produced from an electrical image log of a wall of the wellbore.

11. The method of claim 1, further comprising:
    determining a vug size of the vug based on a rock sample; and
    performing the reservoir fluid flow simulation based on the vug size.

12. The system of claim 6, wherein the computer processor is further configured to:
    determine a vug size of the vug based on a rock sample; and
    perform the reservoir fluid flow simulation based on the vug size.

* * * * *